(12) United States Patent
Wilson et al.

(10) Patent No.: US 11,884,408 B2
(45) Date of Patent: Jan. 30, 2024

(54) MULTI-STAGE PROPELLANT SYSTEMS, ASSEMBLIES, AND METHODS

(71) Applicant: GOODRICH CORPORATION, Charlotte, NC (US)

(72) Inventors: Brian Wilson, Vacaville, CA (US); Kaylyn Beseler, Verona, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/539,479

(22) Filed: Dec. 1, 2021

(65) Prior Publication Data
US 2023/0166851 A1    Jun. 1, 2023

(51) Int. Cl.
| | | |
|---|---|---|
| B64D 25/10 | (2006.01) | |
| F02K 9/34 | (2006.01) | |
| F02K 9/12 | (2006.01) | |
| F02K 9/18 | (2006.01) | |
| F02K 9/28 | (2006.01) | |
| F02K 9/26 | (2006.01) | |

(52) U.S. Cl.
CPC ............... *B64D 25/10* (2013.01); *F02K 9/12* (2013.01); *F02K 9/18* (2013.01); *F02K 9/26* (2013.01); *F02K 9/28* (2013.01); *F02K 9/346* (2013.01)

(58) Field of Classification Search
CPC ..... F02K 9/08; F02K 9/12; F02K 9/18; F02K 9/26; F02K 9/28; F02K 9/346; B64D 25/10; B64D 11/0616
See application file for complete search history.

(56) References Cited

U.S. PATENT DOCUMENTS

| | | | | |
|---|---|---|---|---|
| 2,750,887 | A * | 6/1956 | Marcus | F02K 9/26 60/201 |
| 3,023,572 | A * | 3/1962 | Teague | F02K 9/12 60/39.47 |
| 3,089,418 | A | 5/1963 | Stiefel | |
| 3,166,896 | A * | 1/1965 | Breitengross, Jr. | F02K 9/26 60/39.47 |

(Continued)

FOREIGN PATENT DOCUMENTS

| | | |
|---|---|---|
| FR | 2742483 | 6/1997 |
| JP | 04619813 | 1/2011 |
| WO | 2001038711 | 5/2001 |

OTHER PUBLICATIONS

USPTO, Pre-Interview First Office Action dated Apr. 3, 2020 in U.S. Appl. No. 16/056,293.

(Continued)

*Primary Examiner* — Kyle Robert Thomas
(74) *Attorney, Agent, or Firm* — SNELL & WILMER L.L.P.

(57) ABSTRACT

A solid propellant propulsion motor may comprise: a forward propellant grain extending along a longitudinal axis of a motor case between a forward end of the motor case and a first burn inhibitor layer in the motor case; the first burn inhibitor layer disposed axially adjacent to the forward propellant grain; an aft propellant grain disposed axially adjacent to the first burn inhibitor layer; a second burn inhibitor layer disposed axially adjacent to an aft end of the aft propellant grain; and an ablative material layer disposed on a radially inner surface of the aft propellant grain.

20 Claims, 8 Drawing Sheets

(56) References Cited

U.S. PATENT DOCUMENTS

| | | | | |
|---|---|---|---|---|
| 3,283,510 | A * | 11/1966 | Mangum | F02K 9/95 60/250 |
| 3,380,251 | A * | 4/1968 | Wall | F02K 9/24 60/39.47 |
| 3,447,767 | A * | 6/1969 | MacDonald | B64D 25/10 60/250 |
| 3,609,977 | A | 10/1971 | McCormick | |
| 4,357,795 | A * | 11/1982 | Bastian | F02K 9/94 60/245 |
| 4,594,945 | A | 6/1986 | Alexandris | |
| 7,281,367 | B2 | 10/2007 | Rohrbaugh et al. | |
| 8,191,351 | B2 | 6/2012 | Loehr et al. | |
| 10,982,625 | B2 | 4/2021 | Parinas et al. | |
| 2011/0023449 | A1 * | 2/2011 | Loehr | F02K 9/26 60/254 |
| 2018/0156158 | A1 | 6/2018 | Lynch et al. | |

OTHER PUBLICATIONS

USPTO, First Action Interview Office Action dated Jul. 23, 2020 in U.S. Appl. No. 16/056,293.
USPTO, Notice of Allowance dated Feb. 4, 2021 in U.S. Appl. No. 16/056,293.
United Kingdom Intellectual Property Office, United Kingdom Search Report dated May 31, 2023 in Application No. GB2217931.1.

* cited by examiner

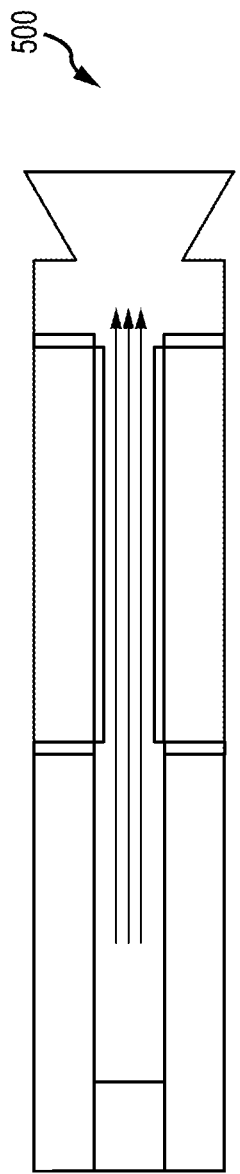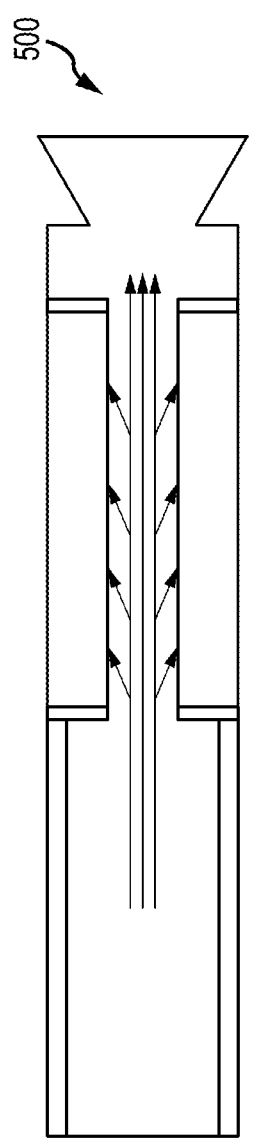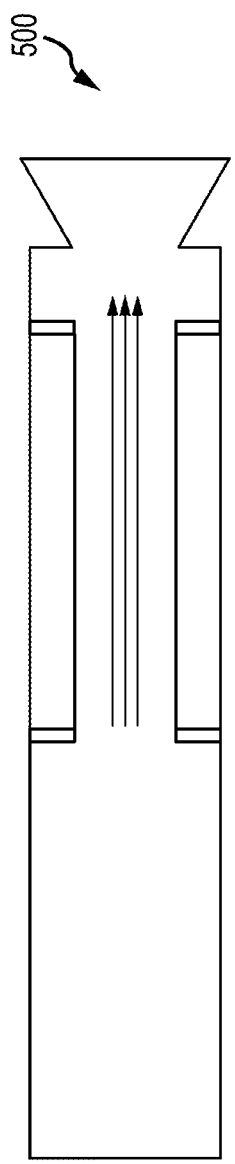

MULTI-STAGE PROPELLANT SYSTEMS, ASSEMBLIES, AND METHODS

FIELD

The present disclosure relates generally to solid fuel propulsion systems, and more particularly, to systems and methods for multi-stage propellant systems methods and assemblies.

BACKGROUND

Solid propellant propulsion motors may include a solid propellant grain material that is cast around a core. The core is then removed by sliding it out from the cast grain material, leaving an open central bore, sometimes referred to as a hollow core or center perforated (CP) core motor design. Ignition at the bore surface of the solid propellant generates high pressure gas, which is expelled from the bore through a nozzle to generate thrust. Mission profiles for propulsion motor performance may desire changes in performance which often utilize different propellant grain geometries or the use of multiple propellant formulations.

SUMMARY

A solid propellant propulsion motor is disclosed herein. The solid propellant propulsion motor may comprise: a forward propellant grain extending along a longitudinal axis of a motor case between a forward end of the motor case and a first burn inhibitor layer in the motor case; the first burn inhibitor layer disposed axially adjacent to the forward propellant grain; an aft propellant grain disposed axially adjacent to the first burn inhibitor layer; a second burn inhibitor layer disposed axially adjacent to an aft end of the aft propellant grain; and an ablative material layer disposed on a radially inner surface of the aft propellant grain.

In various embodiments, the aft propellant grain is ignited by the forward propellant grain in response to the ablative material layer being eroded during burning of the forward propellant grain.

In various embodiments, the ablative material layer is eroded in response to heat from gaseous combustion by-products from burning the forward propellant grain.

In various embodiments, the first burn inhibitor layer, the second burn inhibitor layer, the ablative material layer, and a second radially inner surface of the motor case define a housing for the aft propellant grain.

In various embodiments, the first burn inhibitor layer is co-axial with the second burn inhibitor layer. The forward propellant grain may be co-axial with the aft propellant grain.

In various embodiments, the solid propellant propulsion motor further comprises a nozzle structure disposed at an aft end of the motor case.

In various embodiments, a burn front of the forward propellant grain travels radially outward and a second burn front of the aft propellant grain travels radially outward.

An ejection catapult assembly is disclosed herein. The ejection catapult assembly may comprise: a mortar tube; and a solid propellant propulsion motor configured to propel the mortar tube, the solid propellant propulsion motor comprising: a motor case; a forward propellant grain disposed at a forward end of the motor case, an aft propellant grain disposed axially aft of the forward propellant grain and fluidly isolated form the forward propellant grain, and an ablative material layer disposed on a radially inner surface of the aft propellant grain, the ablative material layer configured to erode during burning of the forward propellant grain.

In various embodiments, the ejection catapult assembly may further comprise a first burn inhibitor layer disposed axially between the forward propellant grain and the aft propellant grain. The solid propellant propulsion motor may further comprise a second burn inhibitor layer disposed at an aft end of the aft propellant grain. The first burn inhibitor layer, the second burn inhibitor layer, the ablative material layer, and a second radially inner surface of the motor case may define a housing for the aft propellant grain. The first burn inhibitor layer may be co-axial with the second burn inhibitor layer. The aft propellant grain may be ignited by the forward propellant grain in response to the ablative material layer being eroded during burning of the forward propellant grain.

In various embodiments, the solid propellant propulsion motor further comprises a nozzle structure disposed at an aft end of the motor case.

In various embodiments, the forward propellant grain is co-axial with the aft propellant grain.

In various embodiments, a burn front of the forward propellant grain travels radially outward and a second burn front of the aft propellant grain travels radially outward.

A method for manufacturing a solid propellant propulsion motor is disclosed herein. The method may comprise: disposing a forward propellant grain at a forward end of a motor case; disposing a first burn inhibitor layer axially adjacent to the forward propellant grain; disposing an aft propellant grain axially adjacent to the first burn inhibitor layer; and disposing an ablative material layer on a radially inner surface of the aft propellant grain.

In various embodiments, the method comprises disposing a second burn inhibitor layer axially adjacent to an aft end of the aft propellant grain. The motor case, the first burn inhibitor layer, the second burn inhibitor layer, and the ablative material layer may define a housing for the aft propellant grain.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 6A illustrates a schematic view of a solid propellant propulsion motor during operation, in accordance with various embodiments;

FIG. 6B illustrates a schematic view of a solid propellant propulsion motor during operation, in accordance with various embodiments;

FIG. 6C illustrates a schematic view of a solid propellant propulsion motor during operation, in accordance with various embodiments.

DETAILED DESCRIPTION

Figure 1A:
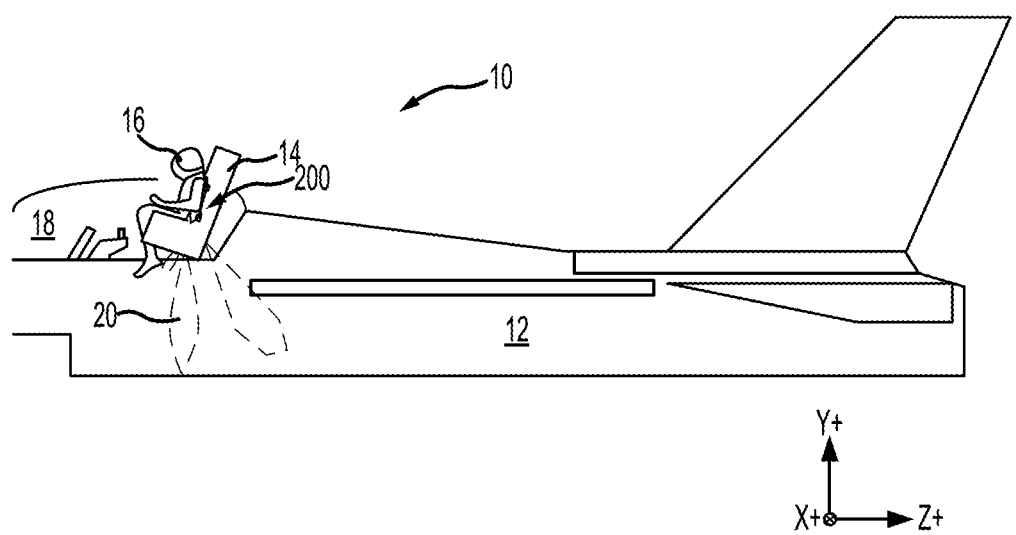
FIG. 1A illustrates an aircraft ejection system, in accordance with various embodiments.

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

The present disclosure provides multi-stage, solid fuel, propulsion motor which is capable of variable thrusts during the course of the propulsion motor's flight. In a first stage of flight, a first propellant grain is burned. In response to the first propellant grain being burned, an ablative material layer configured to enclose a second propellant grain is eroded. In this regard, the ablative material layer is removed during burning of the first propellant grain. The ablative material layer is sized and configured to enclose the second propellant grain until all, or nearly all of the first propellant grain is burned. In this regard, the second propellant grain begins to burn once all the first propellant grain is completely, or near completely burned. Thus, a multi-stage propulsion motor is disclosed herein.

Propulsion motors with variable thrusts are desirable because they can achieve thrust profiles which are optimized for the entire flight. For example, while propulsion motors require large thrusts at the initial period of flight to achieve lift-off, they require less thrust at later periods of flight. This reduction of required thrust is due to the changing mass of the propulsion motor during the course of its flight. The weight of the propulsion motor is at a maximum at the start of its flight, because it contains all the propellant to be used over the whole flight. But once the flight begins, the propellant starts to be consumed and expelled to produce the needed thrust. Since acceleration is equal to force divided by mass, as the mass of the propulsion motor decreases, the acceleration from a constant propulsion force increase. If the thrust is not reduced at later periods of the propulsion motor's flight, the acceleration may increase to a magnitude which damages the payload, or other elements of the propulsion motor.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes ejection catapult assembly 200. Ejection catapult assembly 200 may comprise an element of propulsion system 20 and be configured to extract the ejection seat 14 from cockpit 18.

Figure 1B:
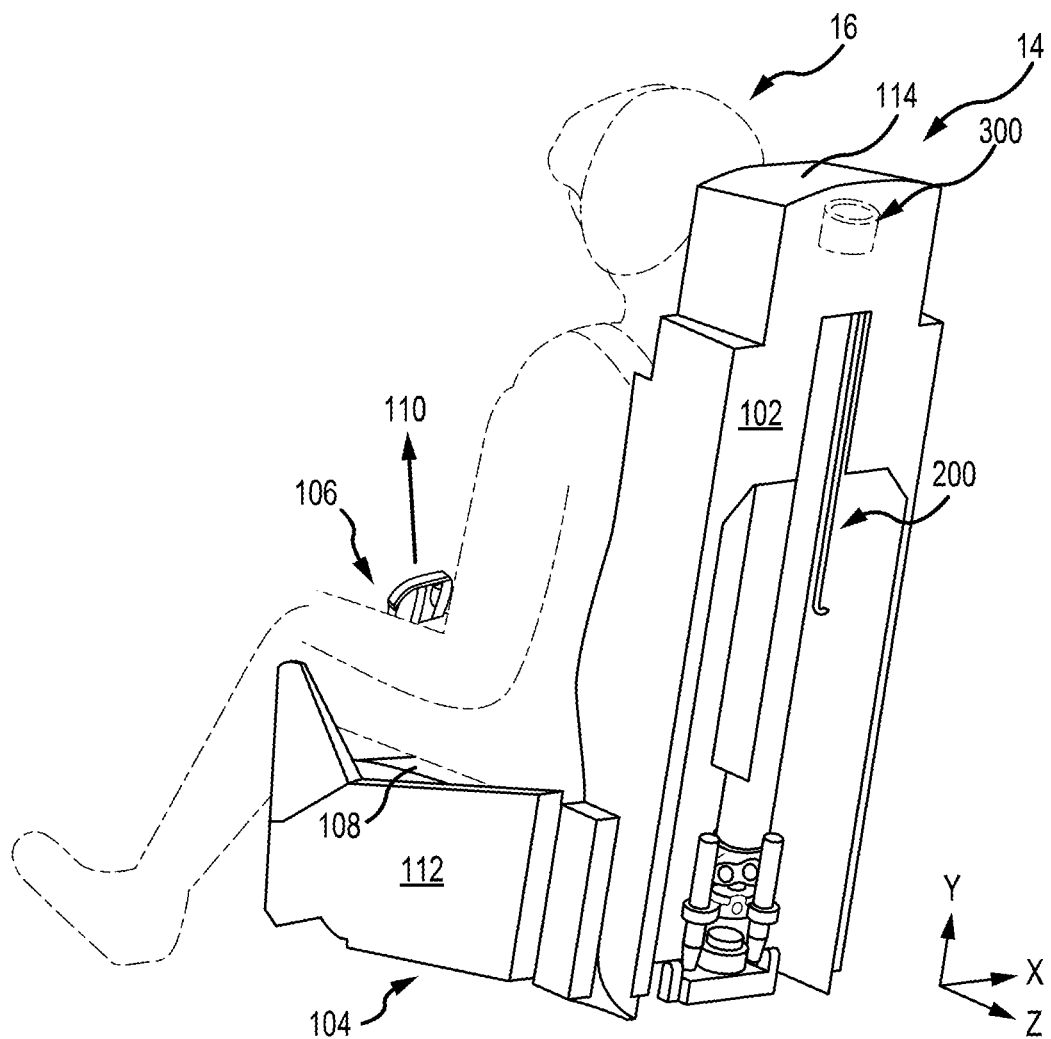
FIG. 1B illustrates an ejection seat having a catapult system in an inactive state, in accordance with various embodiments.

With additional reference to FIG. 1B, ejection seat 14 is illustrated with ejection catapult assembly 200 in an inactive state, in accordance with various embodiments. Ejection seat 14 includes a seat back 102 and a seat pan 108. The ejection catapult assembly 200 is coupled to seat back 102. In various embodiments, an ejection handle 106 may be located proximate a seat bucket 104 of seat pan 108. Seat bucket 104 of seat pan 108 is generally opposite, or distal, seat back 102. While FIG. 1B shows ejection handle 106 located at seat bucket 104 of seat pan 108, it is further contemplated and understood that ejection handle 106 may be located anywhere that is accessible to an occupant of ejection seat 14. For example, ejection handle 106 may be located on a side 112 of seat pan 108 or a headrest 114 of seat back 102.

Figure 2:
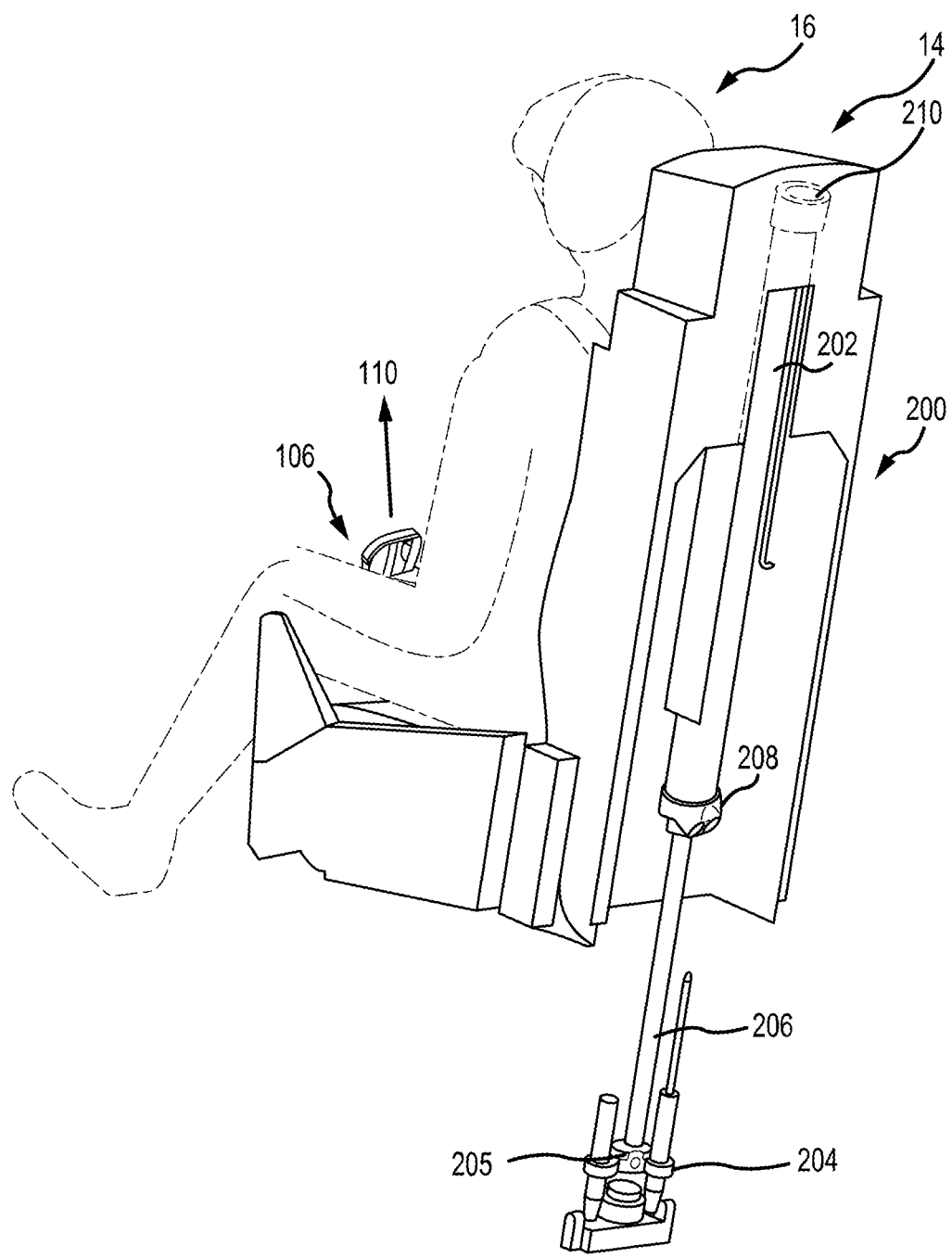
FIG. 2 illustrates an ejection seat having a catapult system in an active state, in accordance with various embodiments.

With additional reference to FIG. 2, ejection seat 14 is illustrated with ejection catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the ejection catapult assembly 200. Ejection catapult assembly 200 may comprise a mortar assembly 202, a breech 204, a catapult cartridge unit 205, a nozzle assembly 208, and a motor cap assembly 210. In response to activation, the catapult cartridge unit 205 may ignite and tend to produce relatively hot, high pressure, gas. Breech 204 may be coupled to the aircraft 12 and comprise a mortar tube 206 disposed within the mortar assembly 202. In various embodiments, motor cap assembly 210 may direct a first portion of gas to the breech 204 tending thereby to drive the mortar tube 206 outward of the mortar assembly 202 and cause ejection seat 14 to be expelled from cockpit 18. In various embodiments, mortar tube 206 may separate from the mortar assembly 202 in response to ejection seat 14 departing from the cockpit 18. In various embodiments, the breech 204 may include an integral gas generator which, in response to activation, may drive the mortar tube 206 outward of the mortar assembly 202 and cause ejection seat 14 to be expelled from cockpit 18. In various embodiments, the mortar assembly 202 may be ignited in response to mortar tube 206 exiting the mortar assembly 202.

Figure 3:
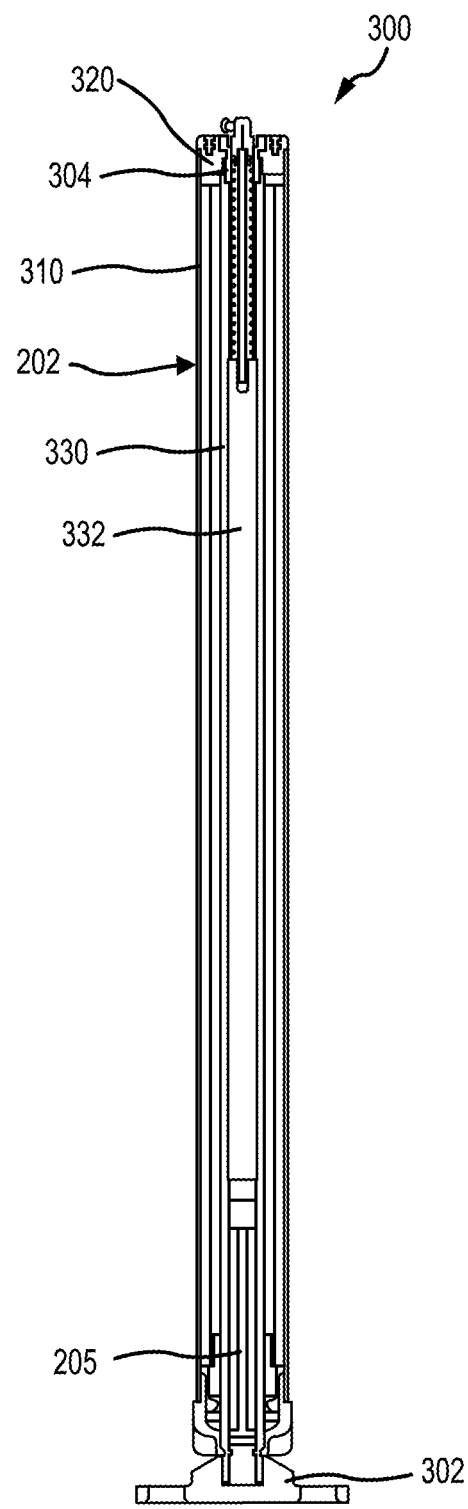
FIG. 3 illustrates a cross-sectional portion of an ejection catapult assembly, in accordance with various embodiments.

Referring now to FIG. 3, a cross-section of a portion of an ejection catapult assembly 300 in an inactive state, in accordance with various embodiments, is illustrated. The ejection catapult assembly 300 may comprise a proximal end 302 and a distal end 304 disposed opposite the proximal end 302. The proximal end 302 may be configured to be coupled to an aircraft (e.g., aircraft 12 from FIG. 1A). The distal end 304 may be configured to be coupled to an ejection seat (e.g., ejection seat 14 from FIG. 1A). The ejection catapult assembly 300 may further comprise a motor outer case 310 extending from proximal end 302 to distal end 304, a head cap 320 coupled to the motor outer case 310 at distal end 304, and a motor inner case 330 disposed radially inward from motor outer case 310. The head cap 320 may be coupled to the motor outer case 310 by any method known in the art, such as a lock ring, or the like. In various embodiments, the motor inner case 330 defines a chamber 332. The chamber 332 may be in fluid communication with a motor cap assembly (e.g., motor cap assembly 210 in FIG. 2).

Figure 4:
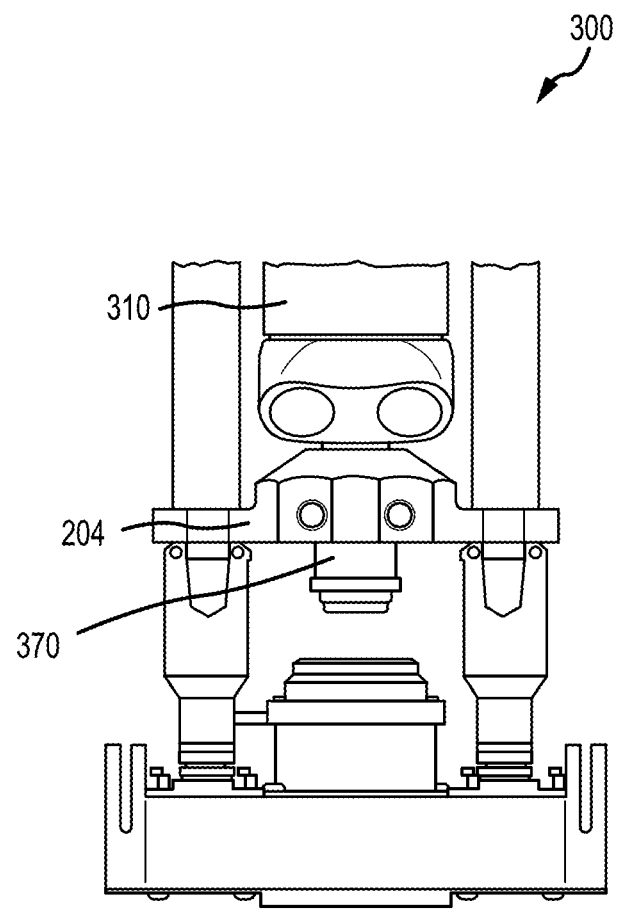
FIG. 4 illustrates a side view of a portion of an ejection catapult assembly, in accordance with various embodiments.

Referring now to FIG. 4, a side view of a portion of an ejection catapult assembly 300, in accordance with various embodiments, is illustrated. The ejection catapult assembly 300 further comprises a drive motor 370 coupled to the breech 204 opposite the motor outer case 310. The drive motor 370 may be configured to translate a shaft of the drive motor 370 along the axis of the motor outer case 310. The shaft of the drive motor 370 may be configured to drive a metering tube disposed in the motor outer case 310 and/or adjust a launch force of the ejection catapult assembly 300.

Figure 5:
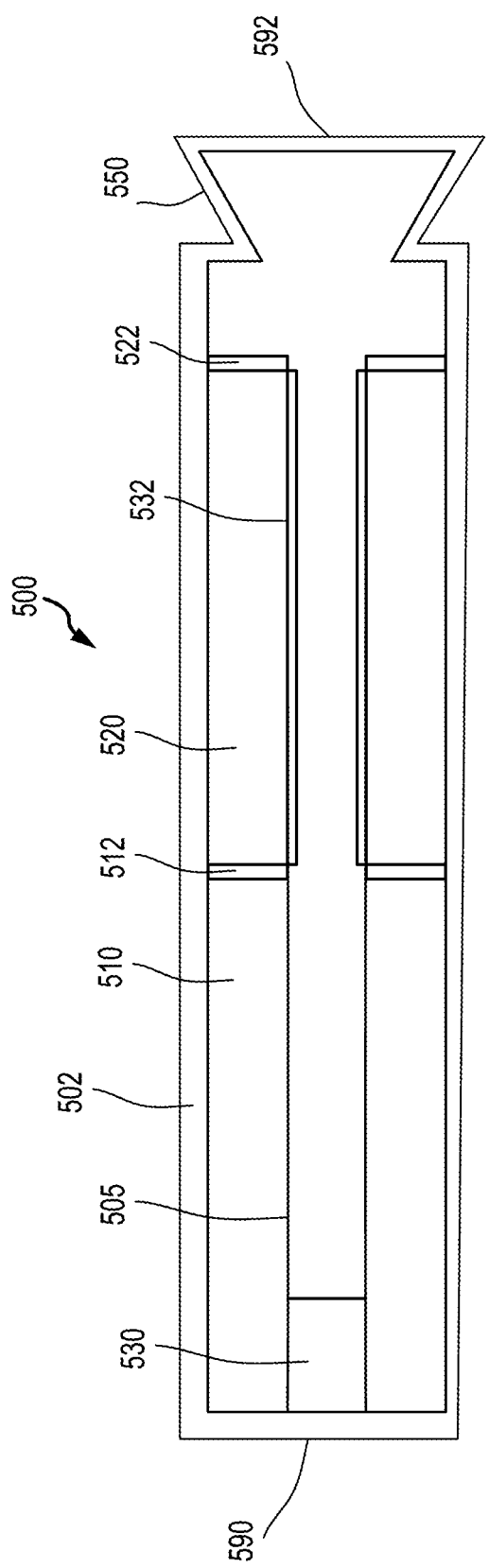
FIG. 5 illustrates a schematic view of a solid propellant propulsion motor having a variable parameter propellant grain, in accordance with various embodiments.

Referring now to FIG. 5, a cross-sectional view of a solid propellant propulsion motor 500 for use in an ejection catapult assembly 300 is illustrated, in accordance with various embodiments. Although described herein with respect to ejection catapult assembly 300, the present disclosure is not limited in this regard. For example, any propulsion assembly is within the scope of this disclosure. The solid propellant propulsion motor 500 may comprise a forward end 590 and an exhaust end 592. Solid propellant propulsion motor 500 may comprise a forward propellant grain 510 extending along a longitudinal axis of the solid propellant propulsion motor 500 radially inward of a motor case 502 of the solid propellant propulsion motor 500. Along the center axis of forward propellant grain 510 is a cylindrical hollow core region, referred to herein as a center perforation 505, at least partially containing an ignitor 530, in accordance with various embodiments. Center perforation 505 may define a bore extending longitudinally through forward propellant grain 510.

Solid propellant propulsion motor 500 may comprise a first burn inhibitor layer 512 disposed at an aft end of the forward propellant grain 510. Solid propellant propulsion motor 500 may comprise an aft propellant grain 520 disposed aft, and adjacent to, the first burn inhibitor layer 512. Solid propellant propulsion motor 500 may comprise a second burn inhibitor layer 522 disposed at an aft end of the aft propellant grain 520. Solid propellant propulsion motor 500 may comprise an ablative material layer 532 disposed on a radially inner surface of the aft propellant grain 520. In this regard, the burn inhibitor layers 512, 522 and the ablative material layer 532 enclose the aft propellant grain 520 in combination with a radially inner surface of the motor case 502.

Solid propellant propulsion motor 500 may comprise the ignitor 530 disposed at the forward end 590. Ignitor 530 may be at least partially disposed in center perforation 505. Ignitor 530 may be configured to ignite forward propellant grain 510. It should be noted, at this point, that the ignitor 530 is shown schematically, and the electrical connections have not been shown. The particular ignitor and electrical connections are well known in the art and can be selected in accordance with the particular propellant/oxidizer utilized, and other desired design features.

Forward end 590 of the solid propellant propulsion motor 500 may be sealed and exhaust end 592 may be terminated by a nozzle structure 550. Upon ignition by ignitor 530, the inner surface of forward propellant grain 510 (i.e. center perforation 505) begins burning, thereby becoming the burn front, which is the surface of the propellant grain being combusted or burned at any given time (as shown in FIG. 6A). The burning then continues, with the burn front propagating radially outward from the hollow core, yielding gaseous combustion by-products at high temperature and pressure (as shown in FIG. 6A). The expulsion of these gaseous combustion by-products through the nozzle structure 550 provides the thrust of the solid propellant propulsion motor 500. Consumption the forward propellant grain 510 continues until the burn front reaches the radially inner surface of the motor case. Upon reaching the radially inner surface of the motor case, the ablative material layer 532 is completely eroded due to the gaseous combustion by-products and high temperature from burning of the forward propellant grain 510 (as shown in FIGS. 6B and 6C). The remaining forward propellant grain 510 being burned ignites the aft propellant grain 520 once the ablative material layer 532 is completed eroded (as shown in FIG. 6B). In this regard, upon depletion of forward propellant grain 510, the aft propellant grain 520 is ignited. Upon ignition by forward propellant grain 510, the exhaust radially inner surface of aft propellant grain 520 begins burning, thereby becoming the burn front (as shown in FIG. 6C). The burning then continues, with the burn front propagating radially inward from the radially inner surface of the aft propellant grain 520, yielding gaseous combustion by-products at high temperature and pressure. The expulsion of these gaseous combustion by-products through the nozzle structure 550 provides the thrust of the solid propellant propulsion motor 500. Consumption of aft propellant grain 520 continues until the burn front reaches the radially inner surface of the motor case 502 and the aft propellant grain 520 is depleted.

Disclosed herein is a simple solid propellant propulsion motor propellant design, allowing for weight savings, in particular when compared with other more complex propulsion motor propellant designs, in accordance with various embodiments. Furthermore, solid propellant propulsion motor 500 provides a variable performance propellant design. In various embodiments, a first phase of the propellant grain combustion (e.g., combustion of forward propellant grain 510) may provide a relatively higher pressure burn for a relatively shorter duration and a second phase of the propellant grain combustion (e.g., combustion of aft propellant grain 520) may provide a relatively lower pressure burn for a relatively longer duration. For example, solid propellant propulsion motor 500 provides fast, high thrust ignition via forward propellant grain 510, followed by slow and steady thrust via aft propellant grain 520. Such a design may be particularly useful for propulsion systems that unlock and/or break restraints and then jettison from a larger flight vehicle. However, any suitable variable performance propellant burn phases may be realized using the disclosed propellant grain design depending on the desired performance parameters based on a mission profile.

In various embodiments, a radially inner surface of the motor case 502, the burn inhibitor layers 512, 522 and the ablative material layer 532 may define a housing for the aft propellant grain 520. The aft propellant grain 520 may be disposed within the housing.

In various embodiments, the aft propellant grain 520 is co-axial with the forward propellant grain 510. In various embodiments, as the gaseous combustion by-products travel axially aft through the nozzle structure 550, they travel over the ablative material layer 532 causing the ablative material layer 532 to erode.

In various embodiments, forward propellant grain 510 and/or aft propellant grain 520 may be comprised of a composite propellant comprising both a fuel and an oxidizer mixed and immobilized within a cured polymer-based binder. For example, forward propellant grain 510 and/or aft propellant grain 520 may comprise an ammonium nitrate-based composite propellant (ANCP) or ammonium perchlorate-based composite propellant (APCP). In various embodiments, forward propellant grain 510 and/or aft propellant grain 520 may comprise a distribution of AP ($NH_4ClO_4$) grains embedded in a hydroxyl-terminated polybutadiene (HTPB) matrix.

In various embodiments, the ablative material layer 532 may be a subliming or melting ablator material, a charring ablator material, or an intumescent ablator material. The present disclosure is not limited in this regard. For example, the ablative material layer may comprise silicate, resin, aluminum oxide, polyhedral oligomeric silsesquioxane, carbon-carbon composites, nanofibers, black carbon, or the like.

Figure 7:
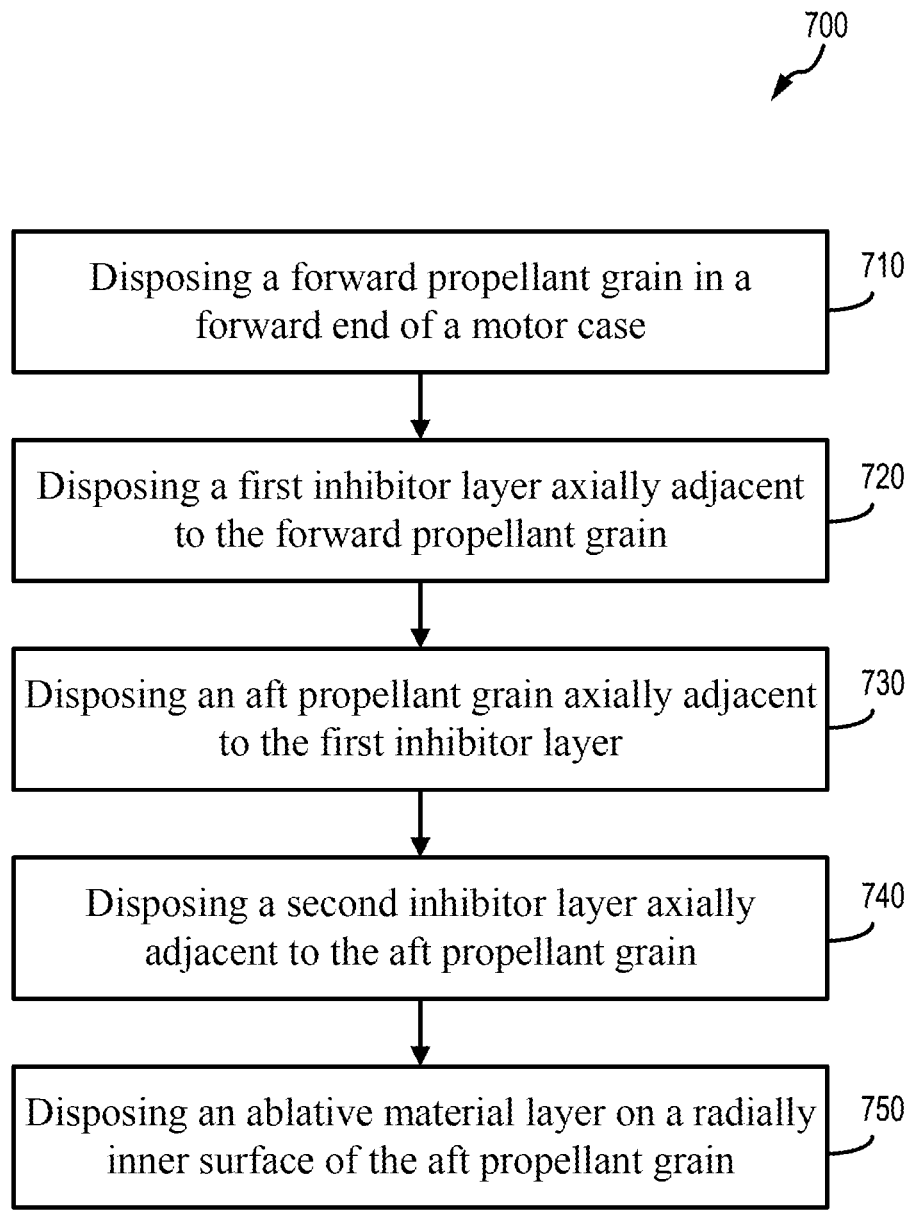
FIG. 7 illustrates a method for manufacturing a solid fuel propellant motor, in accordance with various embodiments.

With reference to FIG. 7, a flow chart illustrating a method 700 for manufacturing a solid propellant propulsion motor is disclosed, in accordance with various embodiments. Method 700 includes disposing a forward propellant grain in a forward end of a motor case (step 710). Method 700 includes disposing a first burn inhibitor layer axially adjacent to the forward propellant grain (step 720). Method 700 further includes disposing an aft propellant grain axially adjacent to the first burn inhibitor layer (step 730). Method 700 further includes disposing a second burn inhibitor layer axially adjacent to the aft propellant grain (step 740). Method 700 further comprises disposing an ablative material layer on a radially inner surface of the aft propellant grain (step 750).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A solid propellant propulsion motor for an ejection catapult assembly, comprising:
   a motor case configured to be coupled to the ejection catapult assembly;
   a forward propellant grain extending along a longitudinal axis of the motor case between a forward end of the motor case and a first burn inhibitor layer in the motor case;
   the first burn inhibitor layer disposed axially adjacent to the forward propellant grain;
   an aft propellant grain disposed axially adjacent to the first burn inhibitor layer;
   a second burn inhibitor layer disposed axially adjacent to an aft end of the aft propellant grain; and
   an ablative material layer disposed on a radially inner surface of the aft propellant grain, wherein during operation of the solid propellant propulsion motor, the solid propellant propulsion motor includes:
   a first phase of combustion of the forward propellant grain, and
   a second phase of combustion of the aft propellant grain, the first phase of combustion having a higher pressure burn and a shorter duration relative to the second phase of combustion.

2. The solid propellant propulsion motor of claim 1, wherein the aft propellant grain is ignited by the forward propellant grain in response to the ablative material layer being eroded during burning of the forward propellant grain.

3. The solid propellant propulsion motor of claim 1, wherein the ablative material layer is eroded in response to heat from gaseous combustion by-products from burning the forward propellant grain.

4. The solid propellant propulsion motor of claim 1, wherein the first burn inhibitor layer, the second burn inhibitor layer, the ablative material layer, and a second radially inner surface of the motor case define a housing for the aft propellant grain.

5. The solid propellant propulsion motor of claim 1, wherein the first burn inhibitor layer is co-axial with the second burn inhibitor layer.

6. The solid propellant propulsion motor of claim 5, wherein the forward propellant grain is co-axial with the aft propellant grain.

7. The solid propellant propulsion motor of claim 1, further comprising a nozzle structure disposed at an aft end of the motor case.

8. The solid propellant propulsion motor of claim 1, wherein a burn front of the forward propellant grain travels radially outward and a second burn front of the aft propellant grain travels radially outward.

9. An ejection catapult assembly, comprising:
a mortar tube; and
a solid propellant propulsion motor configured to propel the mortar tube, the solid propellant propulsion motor comprising:
a motor case,
a forward propellant grain disposed at a forward end of the motor case,
an aft propellant grain disposed axially aft of the forward propellant grain and fluidly isolated from the forward propellant grain, and
an ablative material layer disposed on a radially inner surface of the aft propellant grain, the ablative material layer configured to erode during burning of the forward propellant grain, wherein during operation of the solid propellant propulsion motor, the solid propellant propulsion motor includes:
a first phase of combustion of the forward propellant grain, and
a second phase of combustion of the aft propellant grain, the first phase of combustion having a higher pressure burn and a shorter duration relative to the second phase of combustion.

10. The ejection catapult assembly of claim 9, further comprising a first burn inhibitor layer disposed axially between the forward propellant grain and the aft propellant grain.

11. The ejection catapult assembly of claim 10, wherein the solid propellant propulsion motor further comprises a second burn inhibitor layer disposed at an aft end of the aft propellant grain.

12. The ejection catapult assembly of claim 11, wherein the first burn inhibitor layer, the second burn inhibitor layer, the ablative material layer, and a second radially inner surface of the motor case define a housing for the aft propellant grain.

13. The ejection catapult assembly of claim 11, wherein the first burn inhibitor layer is co-axial with the second burn inhibitor layer.

14. The ejection catapult assembly of claim 9, wherein the aft propellant grain is ignited by the forward propellant grain in response to the ablative material layer being eroded during burning of the forward propellant grain.

15. The ejection catapult assembly of claim 9, wherein the solid propellant propulsion motor further comprises a nozzle structure disposed at an aft end of the motor case.

16. The ejection catapult assembly of claim 9, wherein the forward propellant grain is co-axial with the aft propellant grain.

17. The ejection catapult assembly of claim 9, wherein a burn front of the forward propellant grain travels radially outward and a second burn front of the aft propellant grain travels radially outward.

18. A method for manufacturing a solid propellant propulsion motor for an ejection catapult assembly, comprising:
disposing a forward propellant grain at a forward end of a motor case;
disposing a first burn inhibitor layer axially adjacent to the forward propellant grain;
disposing an aft propellant grain axially adjacent to the first burn inhibitor layer;
disposing an ablative material layer on a radially inner surface of the aft propellant grain, wherein the forward propellant grain is configured to provide a higher pressure burn for a shorter duration during combustion relative to the aft propellant grain; and
coupling the motor case to the ejection catapult assembly.

19. The method of claim 18, further comprising disposing a second burn inhibitor layer axially adjacent to an aft end of the aft propellant grain.

20. The method of claim 19, wherein the motor case, the first burn inhibitor layer, the second burn inhibitor layer, and the ablative material layer define a housing for the aft propellant grain.

* * * * *